United States Patent

Jones

[11] 4,038,883
[45] Aug. 2, 1977

[54] COMPACT TRANSMISSION

[75] Inventor: Ronald N. Jones, Fredericktown, Ohio

[73] Assignee: The J. B. Foote Foundry Co., Fredericktown, Ohio

[21] Appl. No.: 612,257

[22] Filed: Sept. 10, 1975

[51] Int. Cl.$^2$ .................. B60K 17/04; F16H 3/08; F16H 5/06; F16H 57/02

[52] U.S. Cl. .................. 74/337.5; 74/421 R; 74/475; 74/606 R

[58] Field of Search .................. 192/99.5; 74/337.5, 74/355, 366, 369, 372, 373, , 352, 375–378, 473 R, 475, 606 R, 332, 334, 335, 339, 404, 412 R, 421 R, 431, 432

[56] References Cited

U.S. PATENT DOCUMENTS

| 1,320,645 | 11/1919 | Osmondson | 74/421 R |
|---|---|---|---|
| 1,807,779 | 6/1931 | Drew | 74/473 R |
| 1,984,039 | 12/1934 | Sieg | 74/473 R X |
| 2,575,379 | 11/1951 | Benning | 192/99.5 X |
| 2,729,519 | 1/1956 | Bottenhorn | 74/606 R X |
| 3,178,956 | 4/1965 | Stanley | 74/375 |
| 3,301,080 | 1/1967 | Musgrave | 74/375 |
| 3,426,611 | 2/1969 | Hauser | 74/475 |
| 3,457,798 | 7/1969 | Musgrave | 74/475 X |
| 3,688,880 | 9/1972 | Lewis | 74/337.5 X |

FOREIGN PATENT DOCUMENTS

| 1,059,174 | 3/1954 | France | 74/432 |
|---|---|---|---|
| 16,878 | 12/1884 | United Kingdom | 74/421 R |
| 612,260 | 11/1948 | United Kingdom | 74/473 R |

*Primary Examiner*—Samuel Scott
*Assistant Examiner*—Carl F. Pietruszka
*Attorney, Agent, or Firm*—Allen D. Gutchess, Jr.

[57] ABSTRACT

A compact transmission designed particularly for a self-propelled, walking lawn mower is provided. The transmission is mounted on the deck of the mower behind the engine and is connected to a power take-off shaft of it. The transmission has two forward speeds and is shifted by a short finger-operated shift lever extending rearwardly. The transmission is compact, light in weight, and low in cost. These are achieved, in part, by the gears being arranged to occupy a minimum space and a one-piece shifter fork and guide plate being made of plastic material and assembled through an opening in the top of the transmission housing. The transmission housing also can use either a horizontal or a vertical input shaft with minimum change in design.

4 Claims, 6 Drawing Figures

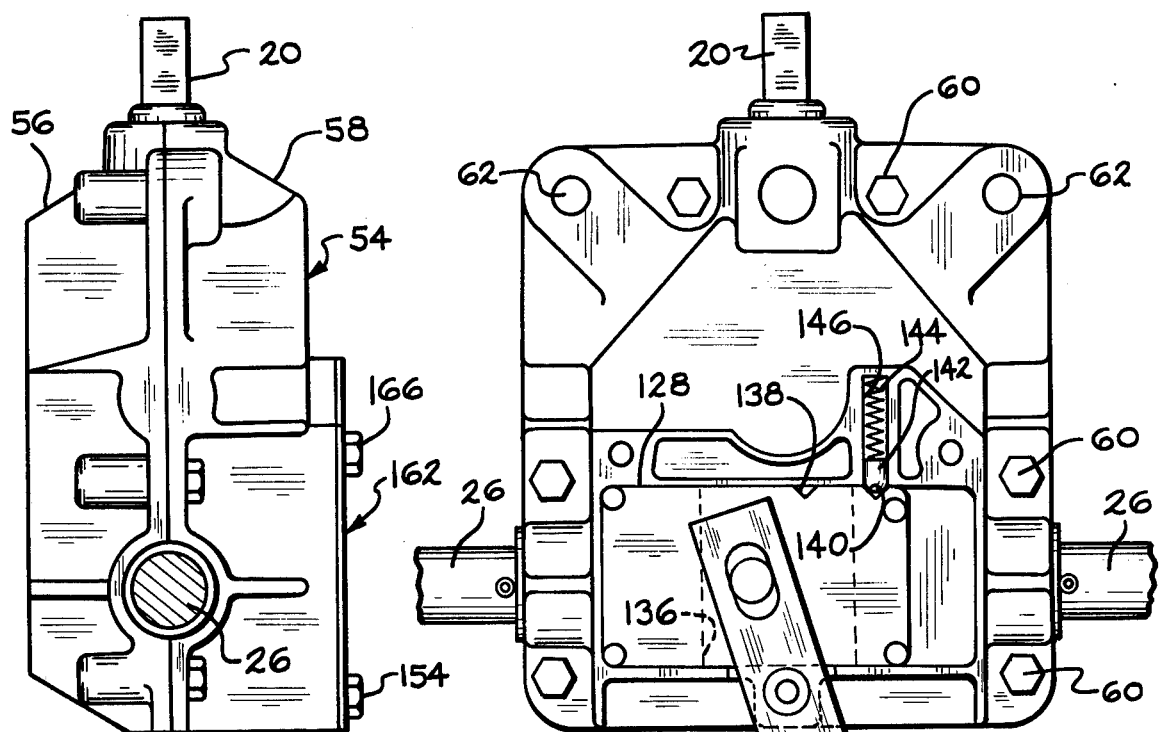
FIG. 3
FIG. 2
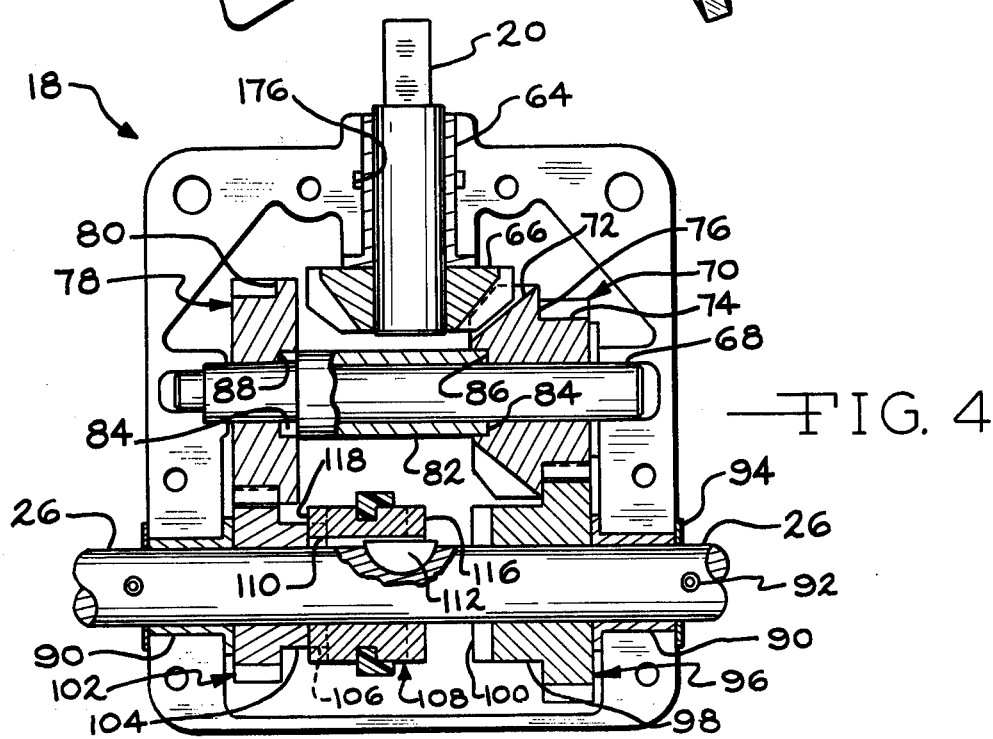
FIG. 4

COMPACT TRANSMISSION

This invention relates to a compact transmission and particularly a transmission for a self-propelled, walking lawn mower.

While self-propelled, walking lawn mowers are well-known in the art, heretofore such mowers have had a direct connection for the blade and the wheels to the engine, with the speed of the blade and drive being controlled only by the throttle. This resulted in excessive forward speed or stalling under some conditions. The present invention provides a compact transmission with two forward speeds for use with a mower of this type. The gears of the transmission are designed so that the transmission housing can occupy a minimum space. It is also light in weight so as not to inhibit maneuverability of the mower and is of relatively low cost.

The transmission incorporates a shifter fork and guide plate of one-piece plastic material which can be assembled with the transmission through an opening in the top of the housing, with this opening then being closed off by the guide plate itself in all positions thereof. The transmission also incorporates a unique torque tube connection between certain gears therein.

The housing of the transmission is made in an upper half and a lower half and the transmission can be changed from having a horizontal input shaft to a vertical input shaft only by changing the design of the upper housing. This minimizes die costs.

It is, therefore, a principal object of the invention to provide an improved compact and low-cost transmission for a self-propelled, walking lawn mower.

Another object of the invention is to provide a two-forward speed transmission for a self-propelled walking lawn mower having a number of features as outlined above.

Many other objects and advantages of the invention will be apparent from the following detailed description of preferred embodiments thereof, reference being made to the accompanying drawings, in which:

FIG. 2 is a top view of the transmission with a cover plate removed;

FIG. 3 is a left-end view of the transmission with the cover plate in place;

FIG. 4 is a view primarily in horizontal cross section taken centrally through the transmission;

Figure 1:
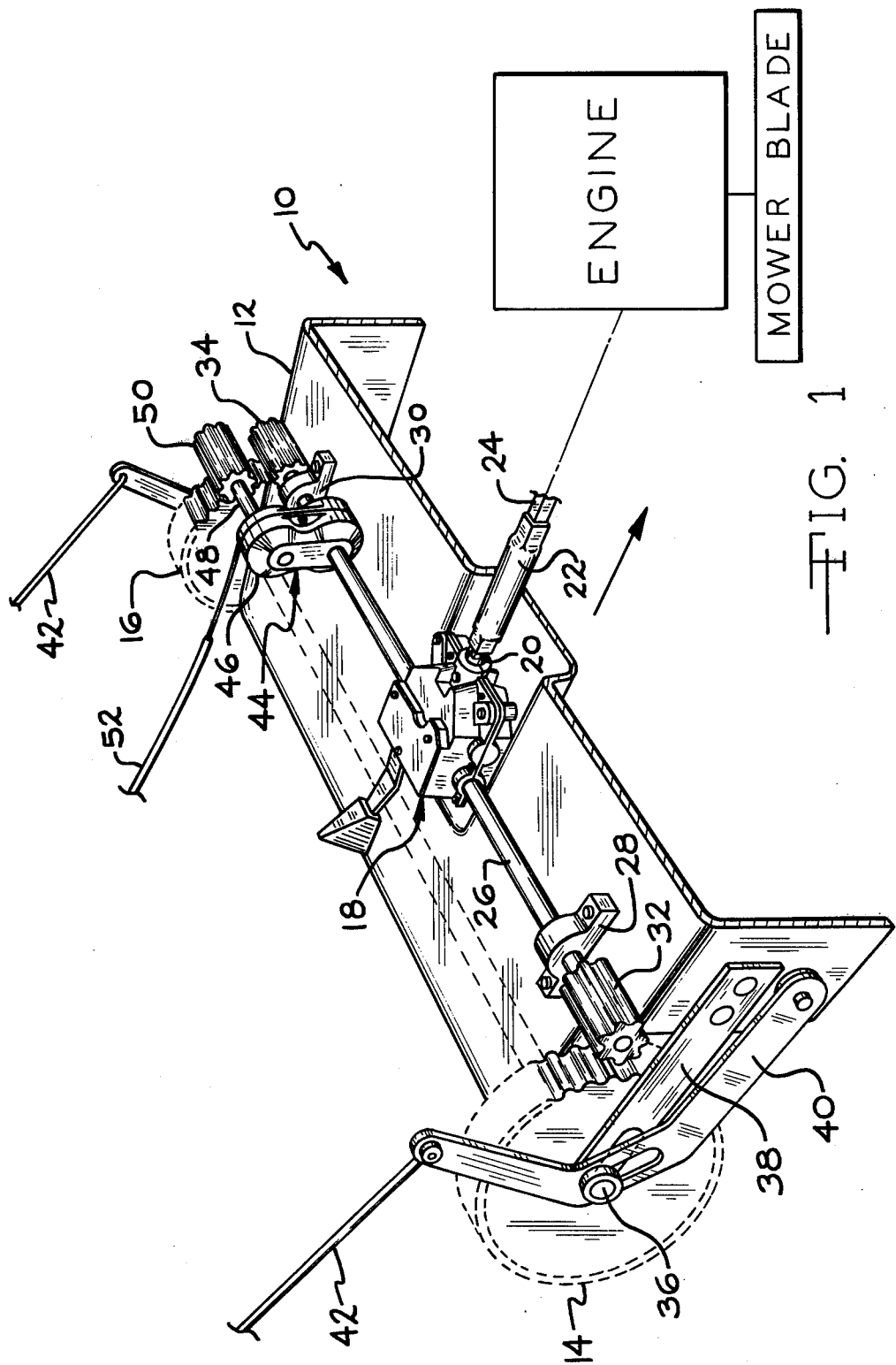
FIG. 1 is a somewhat schematic and diagrammatic view of a self-propelled, walking lawn mower embodying a compact transmission according to the invention.

Referring to FIG. 1, a self-propelled, walking lawn mower 10 includes a metal deck 12 and driven rear wheels 14 and 16. A transmission 18 embodying the invention has an input shaft 20 extending forwardly and connected through a tubular drive shaft 22 having squared ends to a power take-off shaft 24 of an engine. The engine drives the mower blade directly, in this instance, through a main vertical drive shaft. Rather than having the power take-off shaft 24, a sheave can be mounted on the main shaft between the engine and the mower blade and can be connected to the input shaft 20 of the transmission 18 through a suitable belt and sheave arrangement.

The transmission 18 has an output shaft 26 extending outwardly from both sides thereof which is rotatably supported on the deck 12 by bearing blocks 28 and 30. Beyond the bearing blocks are drive members or cylinders 32 and 34 which drive the rear wheels 14 and 16 when engaged therewith. With the output shaft 26 being in a fixed position relative to the deck 12, the rear wheels 14 and 16 are moved into and out of engagement with the cylinders 32 and 34 by remote operator-controlled means. As shown, an axle 36 of the rear wheels 14 and 16 is mounted for horizontal movement in slots of mounting bars 38. When levers 40 are pivoted forwardly by operator-controlled rods 42, the axle 36 and the wheels 14 and 16 are moved forwardly into engagement with the drive cylinders 32 and 34. Of course, other means can be designed to engage and disengage the rear wheels, the specific means for same not being part of the invention.

If desired, the mower 10 can also be driven in reverse. For this purpose, a reverse mechanism 44 includes two meshing spur gears in a housing 46, one of the spur gears being mounted on the on the output shaft 26 and the other being mounted on a stub-shaft 48 on which is a reverse drive member or cylinder 50. When the wheels 14 and 16 are disengaged from the drive cylinders 32 and 34, the housing 46 can be moved in a counterclockwise direction as viewed in FIG. 1, as by means of a flexible cable 52, to bring the drive cylinder 50 into engagement with the wheel 16 and drive the wheels in reverse, with the drive cylinder 50 rotating in the direction opposite to the drive cylinders 32 and 34.

Referring particularly to FIGS. 2–4, the transmission 18 includes a housing 54 having a lower housing half 56 and an upper housing half 58, the two being fastened together by machine screws 60. The housing halves 56 and 58 have openings 62 by means of which the transmission 18 can be fastened to the deck 12 of the mower 10 by suitable bolts with the transmission also being partially supported through the output shaft 26 in the bearing blocks 28 and 30.

As shown in FIG. 4, the housing halves are recessed to receive a sleeve bushing 64 for the input shaft 20. A drive bevel gear 66 is fastened to the inner end of the input shaft 20 and bears against a flange of the bushing 64. The housing halves are also recessed to receive an intermediate shaft 68. A combination/gear 70 is rotatably supported on the intermediate shaft 68 and includes a bevel gear portion 72 which meshes with the drive bevel gear 66 and a spur gear portion 74. A shoulder 76 is also formed between the bevel gear portion 72 and the spur gear portion 74, the purpose of which will be subsequently discussed. A second spur gear 78 is also rotatably supported on the intermediate shaft 68 and has a shoulder 80 at the side toward the combination gear 70. A torque tube or sleeve 82 is located on the intermediate shaft 68 and has arcuate end dogs 84 which are engaged in arcuate recesses 86 and 88 in the combination gear 70 and the spur gear 78, respectively. The torque tube serves two functions: it spaces apart the combination gear 70 and the spur gears 78 the proper distance on the intermediate shaft 68 and also causes the spur gear 78 to rotate with the combination gear 70.

The output shaft 26 extends through bushings 90 held in recessed portions of the housing halves 56 and 58 and is held against axial movement by pins 92 extending outwardly therefrom with washers 94 located between the pins 92 and the flange portions of the housing. A third spur gear 96 is rotatably mounted on the output shaft 26 and has a hub 98 with axially-directed projections or teeth 100. The spur gear 96 is retained against axial movement on the output shaft 26 by virtue of the shoulder 76 on the combination gear 70. A fourth spur gear 102 is also rotatably mounted on the output shaft 26 and has a hub 104 with axially-extending projections or teeth 106 directed toward the spur gear 96. The spur gear 102 is retained against axial movement on the output shaft 26 by virtue of the shoulder 80 on the spur gear 78.

A clutch dog 108 is located on the output shaft 26 and has an axially-extending groove 110 which receives a key 112. This enables the clutch dog 108 to rotate with the shaft 26, but move axially with respect thereto. The clutch dog 108 has an annular groove 114 therein to receive shift means which will be subsequently discussed. The clutch dog also has axially-extending projections or teeth 116 and 118 directed toward the spur 96 and the spur gear 102 respectively.

When the clutch dog 108 is in the position shown in FIG. 4, the input shaft 20 is connected with the output shaft 26 through the bevel gear 66, the combination gear 70, the torque tube 82, the spur gear 78, the spur gear 102, the clutch dog 108, and the key 112. When the clutch dog 108 is in its other position, with the teeth 116 engaged with the teeth 100 of the spur gear 96, the input shaft 20 is connected to the output shaft 26 through the bevel gear 66, the combination gear 70, the spur gear 96, the dog 108, and the key 112.

Figure 5:
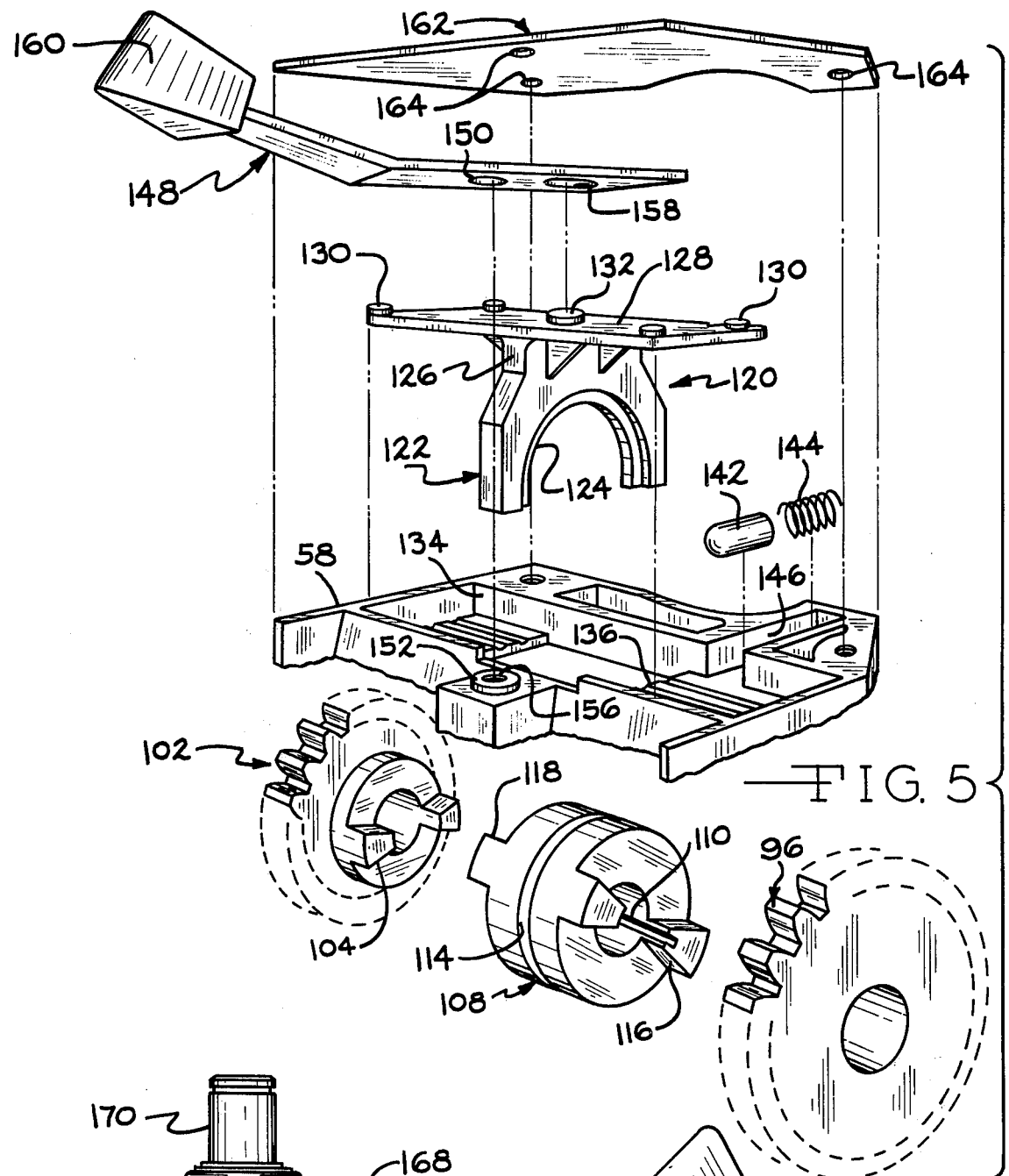
FIG. 5 is an exploded view in perspective of a shift arrangement of the transmission.

The clutch dog 108 is moved between its two positions by shift means 120 of FIG. 5. The shift means 120 includes a shifter fork 122 having a substantially semicircular ridge 124 thereon which is received in the annular groove 114 of the clutch dog 108. The shifter fork 122 has a shank 126 connecting the shifter fork to an upper guide plate 128. The guide plate 128 has buttons 130, the purpose of which will be subsequently discussed, along with a central projection 132. The shift means 120 is made entirely of a one-piece plastic material, such as nylon, which achieves a low cost for this item.

The guide plate 128 is guided axially of the output shaft 26 by virtue of a rectangular recess 134 in the upper housing half 58. The recess 134 has side walls cooperating with the side edges of the guide plate 128 to direct the movement of the shifter fork 122. The shifter fork 122 extends through a rectangular opening 136 in the housing half 58. To enable the shift means 120 to be assembled with the housing, the maximum diagonal dimension across the rectangular opening 136 slightly exceeds the maximum transverse direction of the shifter fork 122. With this arrangement, the shifter fork can then be inserted diagonally in the rectangular opening 136 until the shank 126 is substantially coplanar with the opening 136. The shift means 120 is then rotated to align the guide plate 128 with the rectangular recess 134 to complete the assembly of the shift means 120 with the upper housing half 58. The rectangular opening 136 is always covered by the guide plate 128 for either position of the shifter fork 122 in the transmission. This prevents dirt and the like from entering the transmission.

As shown also in FIG. 2, one edge of the guide plate 128 has notches 138 and 140 therein which receive a detent 142 urged toward the notches by a spring 144, the spring and detent being located in an elongate recess 146 in the upper housing half 58. This arrangement enables the shift means 120 to be held in either of its positions, with the clutch dog 108 engaged with the spur gear 102 or with the spur gear 96.

The shift means 120 is operated by a shift lever 148. The shift lever 148 is of a bent one-piece metal strap, having a pivot hole 150 which is received on a projection 152 extending upwardly from the housing half 58 and cast integrally therewith. The projection 152 is located centrally with respect to the rectangular recess 134 and at the side thereof opposite the input shaft 20. A self-tapping screw 154 (FIG. 3) is received in a recess 156 (FIG. 5) cast in the projection 152. On one side of the pivot hole 150 is a slotted or elongate opening 158 which receives the projection 132 of the guide plate 128. On the opposite side of the pivot hole 150, opposite the slotted opening 158, is a plastic handle 160 affixed thereto. The handle 160 can be readily manipulated by a finger and thumb of the operator to pivot the lever 148 about the projection 152 and to move the shift means 120 between the two positions to select the desired forward speed.

A cover plate 162 is located on a portion of the upper housing half 58 to close off the guide plate recess 134 and the detent recess 146. The cover 162 has three openings 164 therein which receives the self-tapping screw 154 for the lever pivot and two additional screws 166 (FIG. 3). Thus, the self-tapping screw 154 serves to affix the cover plate 162 as well as retain the shift lever 148 on the projection 152. The cover plate 162 also retains the guide plate 128 in the recess 134 with the buttons or projections 130 engaging the bottom surface of the cover plate 162 to retain the shift means 120 in position with the ridge 124 in the clutch dog groove 114.

Figure 6:
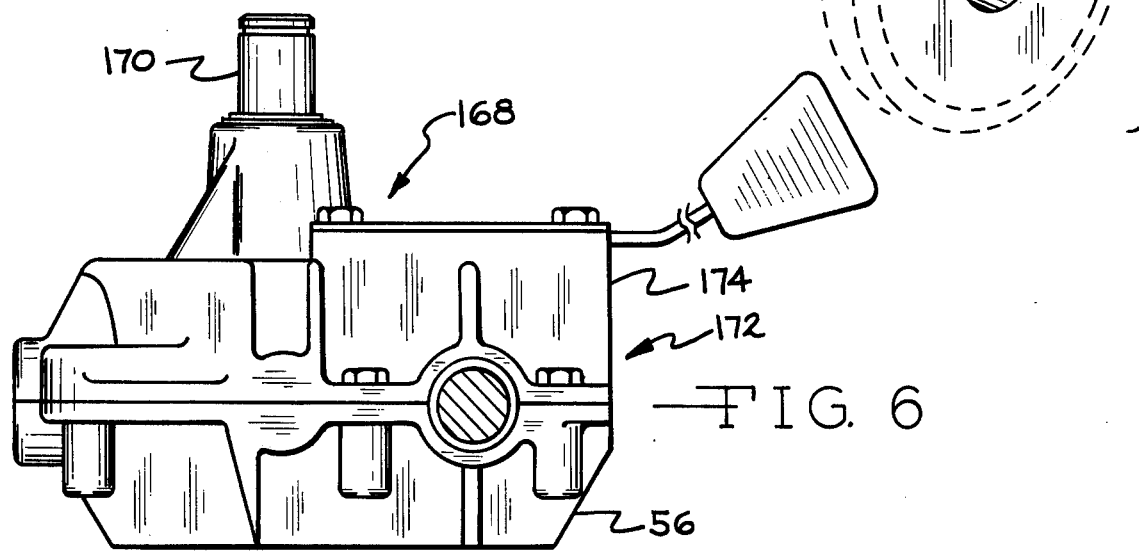
FIG. 6 is a left-end view similar to FIG. 3 of a modified transmission with a vertical input shaft.

With some mower designs, it may be desirable to have a vertical input shaft. This might occur, for example, when the drive for the mower is to be powered from the main blade shaft, rather than a separate power take-off shaft. In such an instance, a sheave can be mounted on the blade shaft and also on the vertical input shaft, with the two being connected by a horizontal drive belt. A transmission 168 with a vertical input shaft 170 is shown in FIG. 6. In this instance, a transmission housing 172 has the same bottom housing half 56 and a modified upper housing half 174. Thus, the transmission 168 can be achieved by only modifying the upper half of the housing. The remainder of the transmission 168 is substantially the same from a component standpoint as the transmission 10. With the modified transmission 168, an opening will remain in the housing where the input shaft 20 was previously received, along with the bushing 64. To close off this opening, an intermediate semicircular groove 176 (FIG. 4) is formed in the input shaft recess. A similar semicircular groove can be formed in a recess of the upper housing half 174. A suitable blocking plastic disc or the like is then assembled into the matching grooves to close off this unused opening of the housing when the input shaft 170 extends up through the upper housing half 172. Thus, the lower housing half 56 needs no modification at all so that the cost of the molds for the transmission housing are substantially reduced.

Various modifications of the above-described embodiments of the invention will be apparent to those skilled in the art and it is to be understood that such modifications can be made without departing from the scope of the invention if they are within the spirit and the tenor of the accompanying claims.

I claim:

1. A compact two-speed transmission comprising an input shaft, a first bevel gear mounted on said input shaft for rotation therewith, an intermediate shaft, a combination second bevel gear and first spur gear on said intermediate shaft, said second bevel gear being engaged with said first bevel gear, a second spur gear on said intermediate shaft, a sleeve around said intermediate shaft between said second bevel gear and said second spur gear and having toothed means engageable with each of said second bevel gear and said second spur gear for enabling said second spur gear to be driven by said second bevel gear and for maintaining said second bevel gear and said second spur gear in fixed, spaced relationship on said intermediate shaft, an output shaft, a third spur gear rotatably mounted on said output shaft and meshing with said first spur gear, a fourth spur gear rotatably mounted on said output shaft and meshing with said second spur gear, said third spur gear having teeth facing toward said fourth spur gear, said fourth spur gear having teeth facing toward said third spur gear, a clutch dog on said output shaft for rotation therewith between said third and fourth spur gears and having teeth facing toward the teeth of both of said third and fourth spur gears, said clutch dog being mounted for axial movement relative to said output shaft, said combination gear having shoulder means extending along the side of the teeth of said third spur gear to retain said third spur gear in a fixed axial position relative to said output shaft, said second spur gear having shoulder means extending along the side of the teeth of said fourth spur gear to retain said fourth spur gear in a fixed axial position relative to said output shaft, a shifter fork engageable with said clutch dog, and lever means engageable with said shifter fork for moving said clutch dog between a position engageable with said third spur gear and a position engageable with said fourth spur gear.

2. A compact transmission according to claim 1 characterized by said shifter fork being structurally integral with an intermediate portion of a guide plate at the end of the fork opposite the end engageable with said clutch dog, said guide plate being mounted for movement axially of said output shaft, said shifter fork and said guide plate being molded in one piece of a plastic material.

3. A compact transmission for a self-propelled power lawn mower, said transmission comprising a housing having means for mounting the transmission on the lawn mower, an input shaft extending outwardly from said housing and having means for being connected to an output shaft of an engine of the mower, a drive gear mounted within said housing on said input shaft, an intermediate shaft mounted within said housing, at least two gears mounted on said intermediate shaft for rotatable movement by said drive gear, an output shaft extending through opposite sides of said housing and having mower drive means outside said housing on both sides thereof, two gears rotatably mounted on said output shaft and each engageable with one of said gears on said intermediate shaft, a clutch dog on said output shaft and mounted thereon for rotatable movement therewith and for axial movement with respect thereto, and shift means engageable with said clutch dog for moving said clutch dog between a position engageable with one of said gears on said output shaft and a position engageable with the other of said gears on said output shaft, said shift means comprising a shifter fork and a guide plate, said guide plate having an intermediate portion structurally integral with an end of said shifter fork at the end of the shifter fork opposite the end engageable with said clutch dog, said shifter fork and said guide plate being made of one piece of plastic material, said housing having a recess for receiving and guiding said guide plate for axial movement with respect to said output shaft, said housing having a rectangular opening in said recess, said shifter fork extending through said rectangular opening and engageable with said clutch dog when said guide plate is received in said recess, said rectangular opening having a maximum diagonal dimension exceeding the maximum transverse dimension of said shifter fork to enable said shifter fork to be inserted through said opening, said rectangular opening having a maximum transverse dimension across said opening smaller than the maximum transverse dimension of said shifter fork to enable said shifter fork to be retained by said housing when said guideplate is in said recess, and the length of said rectangular opening being less than the length of said guide plate whereby said guide plate covers said opening for all positions of said shifter fork.

4. A compact two-speed transmission for a self-propelled power lawn mower, said transmission comprising a housing having a lower half and an upper half, said lower half having means for mounting the transmission on the lawn mower, an input shaft extending outwardly from said housing and having means for being connected to an output shaft of an engine of the mower, said lower housing half having a recess to receive said input shaft, said recess having a substantially semi-circular groove at an intermediate portion thereof to receive a blocking disc when the recess is not used, said upper housing half having an opening through which said input shaft can extend, a drive gear mounted within said housing on said input shaft, an intermediate shaft mounted within said housing, at least two gears mounted on said intermediate shaft for rotatable movement by said drive gear, a sleeve around said intermediate shaft between said two gears and having toothed means engageable with each of said two gears for maintaining said two gears in fixed, spaced relationship on said intermediate shaft and for causing said two gears to rotate together, an output shaft extending through opposite sides of said housing and having mower drive means outside said housing on both sides thereof, two gears rotatably mounted on said output shaft and each engageable with one of said gears on said intermediate shaft, said gears on said intermediate shaft maintaining said two gears on said output shaft in spaced relationship on said output shaft, a clutch dog on said output shaft and mounted thereon for rotatable movement therewith and for axial movement with respect thereto, and shift means engageable with said clutch dog for moving said clutch dog between a position engageable with one of said gears on said output shaft and a position engageable with the other of said gears on said output shaft.

\* \* \* \* \*